UNITED STATES PATENT OFFICE.

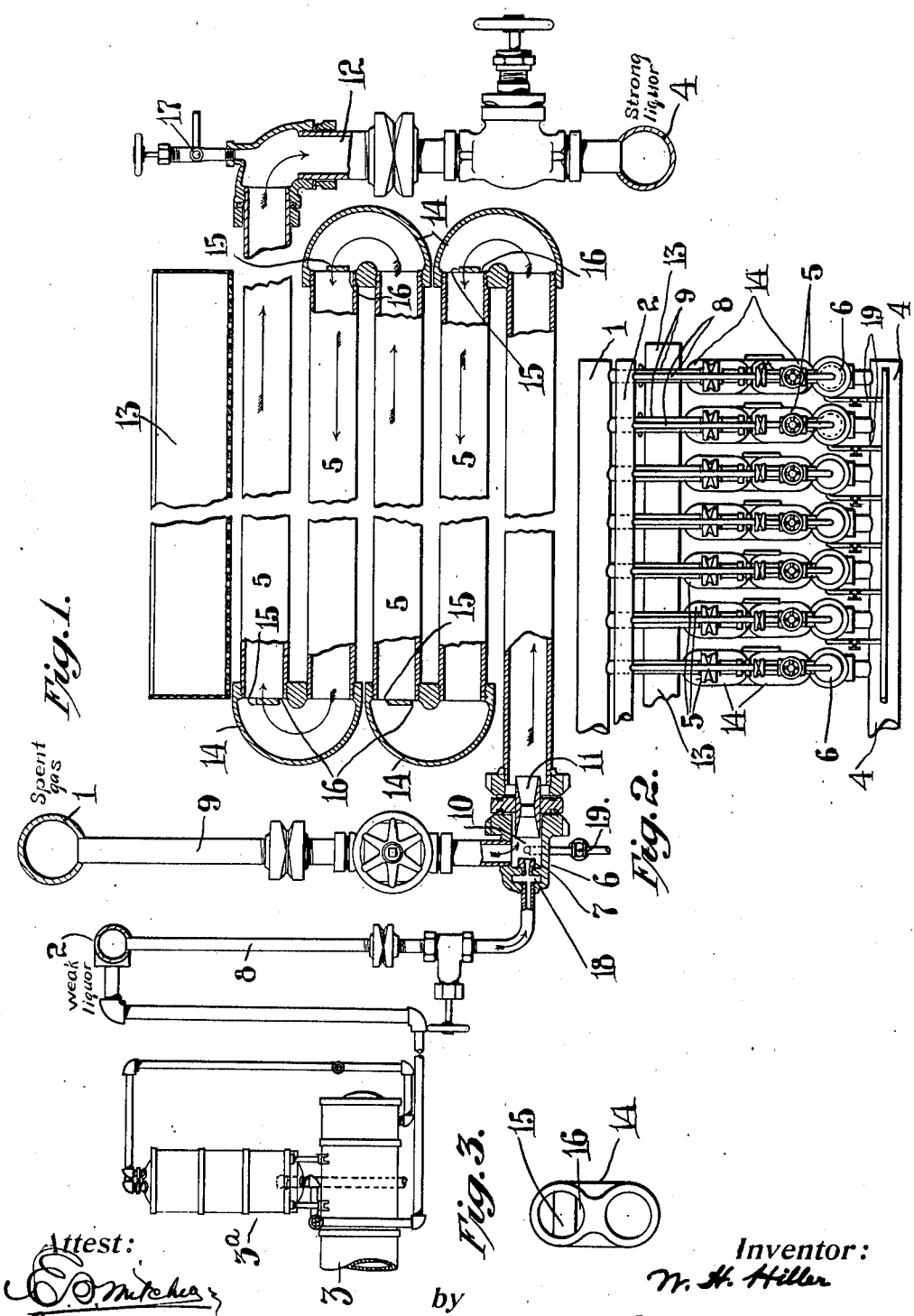

NICOLAI H. HILLER, OF CARBONDALE, PENNSYLVANIA.

ABSORBER.

970,050.  Specification of Letters Patent.  Patented Sept. 13, 1910.

Application filed September 28, 1908. Serial No. 455,094.

*To all whom it may concern:*

Be it known that I, NICOLAI H. HILLER, a citizen of the United States of America, and a resident of Carbondale, county of Lackawanna, State of Pennsylvania, have invented certain new and useful Improvements in Absorbers, of which the following is a specification.

My invention relates to improvements in absorbers, such as are used in absorption refrigerating machines.

The invention consists in improved means for mingling the gas and weak liquor, in improved means for preventing "siphoning," and in other features hereinafter set forth and particularly pointed out in the claims.

The objects of my invention are, to improve the construction of absorbers, to obtain a greater strength of solution, to obtain high efficiency of operation, to make the absorber very easy to operate, to prevent "siphoning," to provide for the easy freeing of the absorber from air or foul gas, and in general to make the absorber relatively inexpensive in construction, simple, compact, and reliable.

The improved absorber herein described comprises one or more return bend pipe coils connected in multiple to the gas return and weak liquor pipe lines and to the strong liquor line, each coil being provided at its lower end with an injector operated by the weak liquor, which injector at once draws the gas into the coil and serves to mix it efficiently with the weak liquor.

In the accompanying drawings I illustrate an absorber such as referred to, Figure 1 showing a side sectional elevation thereof and Fig. 2 an end elevation thereof on a smaller scale. Fig. 3 shows an elevation of one of the elbows or return bend fittings.

In the drawings, 1 designates the gas return pipe line, 2 the weak liquor line, 3 a portion of the generator of an absorption refrigerating apparatus and 3ª the exchanger of such an apparatus, these parts being shown diagrammatically only and for convenience on a smaller scale than the absorber hereinafter mentioned, and 4 designates the strong liquor line.

5, 5 designates return bend pipe coils constituting the absorber. There may be few or many of these coils, according to the desired capacity of the absorber, each coil constituting in fact a separate absorber capable of operation independent of all of the others. At its lower or inlet end each such coil 5 is provided with an injector 6, the nozzle 7 of which is connected to the weak liquor line 2 by a suitably valved pipe 8. The injector is also connected by a suitably valved pipe 9 to the gas return line 1, the gas so delivered being received in the suction or combining chamber 10 of the injector, beyond which is the cone 11. In passing through this injector, the weak liquor and gas are brought into intimate contact and mingled. The liquor and gas then pass into the lower section of the pipe coil 5, and pass up through the several sections thereof, finally passing through valved discharge pipe 12 into the strong liquor line 4. The absorption of ammonia in water or weak aqua ammonia is not effected instantaneously, but requires a certain amount of time, which is afforded during the passage of the gas and liquid, in contact with each other, through the various sections of the coil 5; likewise, much heat is liberated during the absorption of the gas in the weak liquor, and to carry off this heat I arrange to spray water over the pipe coils 5, providing for this purpose a tank 13 having orifices in its bottom through which the water in the tank is sprinkled down upon the upper sections of the coils 5 and falls thence from section to section, so cooling all efficiently.

It is desirable that an absorber shall produce as strong a solution as possible, as, other things being equal, the stronger the solution produced the more efficient the apparatus. Production of a strong solution requires not only efficient cooling of the absorber, but the production of a certain amount of pressure therein, as the greater the pressure under which the absorption takes place, the stronger the solution which can be produced at the temperature obtaining in the absorber. Since the injector 6 is operated by a jet of liquid received into the absorber under pressure, the generator 3 being under pressure during the operation of the apparatus, it is capable of producing a considerable pressure in the absorber itself and so permits operation of the absorber at a relatively high pressure. Production of a strong solution in this absorber is also favored owing to the cooling water first encountering that portion of the absorber in which the solution is the strongest and thence flowing over the other portions of the absorber in which the solution is less strong; the direction of flow of the cooling water being opposite to the general direction of flow of the liquor in the pipe coils—i. e., the general direction of flow of such liquor in the coils being upward, while the cooling water flows downward over the coils, thus tending to maintain the upper coils at a lower temperature than the lower coils; and flowing the cooling water over the coils in this manner is advantageous, not only because it favors the production of a strong solution, and for obvious structural advantages, but also because economy in the use of cooling water is obtained.

In the operation of coil absorbers it has been found that, unless means be taken to prevent, an action termed "siphoning" is apt to occur, whereby a relatively large body of liquid passes over into the discharge pipe 12 suddenly, leaving behind it a space containing only gas. Such action is of course extremely detrimental as it not only lowers the efficiency of the absorber, but renders its operation unsteady. I have found that it may be prevented by providing obstructions in the pipe coil at suitable places, such as the obstructions 15 in the return bends of the pipe coils; these obstructions being, in the form shown, bars cast across the orifices of the return bends. This siphoning is probably due to an action somewhat as follows: Some separation of the gas from the liquid occurs in the pipe coil, producing, so to speak, a "slug" of gas, followed by a "slug" of liquid. When the gas has passed off through pipe 12 and the following slug of liquid passes down through said pipes, as soon as the liquid has passed sufficiently far down in the pipe it siphons off the liquid as far back as the first obstruction, and, if there were no obstructions, it would siphon off practically all of the liquid in the coil. But the obstructions 15 impose such resistance to the flow of the liquid as to break the liquid column at the last or top obstruction, so that practically only that liquid in the coil which has passed beyond the last obstruction is siphoned off, the remainder of the liquid with the gas mixed with it passing through the coil slowly and regularly until, after a time, another slug of separated gas forms, when the operation is repeated. The confining of the siphoning action to the upper section of the coil so reduces the trouble from siphoning that it is practically negligible, whereas heretofore this trouble has been so serious as to interfere greatly with the use of up-flow coil absorbers.

There is preferably, a small opening 16 between the lower side of each obstruction 15, and the bottom of the return bend. Such openings 16 not only permit the several sections of the coil to drain off, when emptying the coil, but have also been found to increase materially the efficiency of the absorber, in operation, for the reason that such openings 16 tend to prevent the formation of separated slugs of gas by permitting the liquor to flow into a section of the coil in which a slug of gas may be forming.

One of the principal troubles experienced in the operation of absorption ice machines is, the necessity of getting air or foul gas out of the absorber. This is particularly true when the apparatus is used for producing very low temperatures; in which case the pressure in the absorber may often be below the atmosphere. In the absorber herein described, air or foul gas may be removed from it, unit by unit, without stopping the operation of the absorber as a whole, by cutting off the units one by one, from the gas return line 1 and from the strong liquor line 4, by closing the valves provided for that purpose, and by opening a vent valve 17 provided at the top of each unit, the connection of the unit so cut off with the weak liquor return line 2 being kept open. Obviously, in the section so cut off, the liquor will rise in that section, driving out all air or gas which may be in that particular section; and when that section is filled with liquor the vent valve 17 may be closed and the valves in the gas return connection and discharge connection opened, and that unit put in operation again. In this way, only one unit of the absorber is out of service at any one time, and the purging of the absorber from air or foul gas is conducted without shutting down the whole absorber.

Another feature of the apparatus illustrated, and particularly of the injector thereof, is the sediment pocket 18 in the injector, in the rear of nozzle 7 thereof. This sediment pocket is designed to retain any dirt (scale or the like) which may come in with the weak liquor and which otherwise might pass through the apparatus. In order that any scale or the like which may fail to deposit in this pocket may not clog the nozzle 7, the bore of said nozzle is made smallest at its front end, so that any dirt or scale which actually enters the bore will surely pass through any other portion of the bore.

Another feature of the invention is the drain connection 19 applied in this case to the injector. By this connection any unit of the absorber may be emptied of its ammonia by drawing off the ammonia through the drain into a suitable empty drum.

The operation of the absorber will be clear from the foregoing description, and hence need not be specifically described.

It will be noted that the gas return line or header 1 is shown at a higher level than the upper pipes of the absorber so that at no time will there be any chance that the liquor may fall back from the absorber through pipe 9 and interfere with the gas coming in through pipe 1.

What I claim is:—

1. An absorber comprising one or more pipe-units, and an injector at the receiving end of such unit or units, each such injector adapted for connection of its nozzle to a weak liquor line and for connection of its combining space to a gas return line, the discharge end of the pipe adapted for connection to a strong liquor line, each said pipe-unit provided at an intermediate point in its length with means obstructing the flow of liquid and gas therethrough.

2. An absorber comprising one or more return bend pipe units comprising sections of pipe and return bend fittings therefor, such sections of pipe located approximately horizontally one above another progressively, and means for supplying weak liquor and gas to the lower portion of such unit or units, and for carrying away strong liquor from the upper portions thereof, one or more of such return bend pipe fittings of each such unit having an obstruction to its bore in its upper nearly horizontal part, whereby siphoning off of large portions of the contents of such units is prevented.

3. An absorber comprising one or more return bend pipe units comprising sections of pipe and return bend fittings therefor, such sections of pipe located approximately horizontally one above another progressively, and means for supplying weak liquor and gas to the lower portion of such unit or units, and for carrying away strong liquor from the upper portions thereof, one or more of such return bend pipe fittings of each such unit having an obstruction to its bore in its upper nearly horizontal part, there being an opening for the passage of liquid between the lower portion of such obstruction or obstructions, and the bottom of the corresponding return bend pipe fitting, whereby siphoning off of large portions of the contents of such units is prevented.

4. An absorber comprising a plurality of pipe units, said units having multiple connections to a weak liquor header, to a gas header, and to a strong liquor header, and having valves in such connections, and having each a valved vent at substantially its top, through which air and foul gas may be drawn off.

5. An absorber comprising one or more pipe units and an injector at the receiving end of such unit or units, each such injector adapted for connection of its nozzle to a weak liquor line and for connection of its combining space to a gas return line, and having in rear of its nozzle a sediment pocket, the bore of the nozzle of gradually increasing diameter from the sediment pocket onward.

In testimony whereof I have signed this specification in the presence of two subscribing witnesses.

NICOLAI H. HILLER.

Witnesses:
E. M. HOLCOMBE,
F. R. FURBISH.